(12) United States Patent
Schultz et al.

(10) Patent No.: US 9,639,831 B2
(45) Date of Patent: May 2, 2017

(54) SECURE PAYMENT OF VIRTUAL ITEMS

(75) Inventors: Charles P. Schultz, North Miami Beach, FL (US); Jose C. Lacal, Boynton Beach, FL (US); Von A. Mock, Boynton Beach, FL (US); Arnold W. Pittler, Ft. Lauderdale, FL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1851 days.

(21) Appl. No.: 11/948,399

(22) Filed: Nov. 30, 2007

(65) Prior Publication Data

US 2009/0144633 A1 Jun. 4, 2009

(51) Int. Cl.
*G06Q 20/12* (2012.01)
*G06Q 20/40* (2012.01)

(52) U.S. Cl.
CPC .......... *G06Q 20/123* (2013.01); *G06Q 20/12* (2013.01); *G06Q 20/40* (2013.01); *G06Q 20/4014* (2013.01)

(58) Field of Classification Search
CPC ..................................... G06Q 20/40–20/4018
USPC ........................................................ 705/75
See application file for complete search history.

(56) References Cited

U.S. PATENT DOCUMENTS

| | | | |
|---|---|---|---|
| 2007/0022469 A1* | 1/2007 | Cooper | H04K 1/00 726/3 |
| 2007/0073618 A1 | 3/2007 | Yu et al. | |
| 2007/0111770 A1* | 5/2007 | Van Luchene | A63F 13/12 463/7 |
| 2007/0195998 A1* | 8/2007 | Le Saint et al. | 382/115 |
| 2008/0207329 A1* | 8/2008 | Wallace et al. | 463/42 |

OTHER PUBLICATIONS

White, Ron, "How Computers Work", Millennium Ed., Que Corporation, Indianapolis, IN, 1999.*
Kevin Townsend, Second Life Hack, IT Security, http://www.itsecurity.com/news/news-second-life-hack-091506/, Accessed Oct. 11, 2007.
Virtual card MasterCard, Multibanka, http://www.multibanka.com/eng/physical_services/payments_cards/mastercard, Accessed Oct. 11, 2007.

(Continued)

*Primary Examiner* — Chrystina Zelaskiewicz
(74) *Attorney, Agent, or Firm* — Johnson, Marcou & Isaacs, LLC

(57) ABSTRACT

A method (400, 500) and a system (100) of conducting transactions for acquisition of virtual items. The method can include receiving from a user (108) a request to acquire the virtual item. Responsive to an identity indicator (112) that is exclusively unique to an identity confirmation device (110) being communicated from the identity confirmation device, a determination can be made whether the identity indicator corresponds to the user. Responsive to determining that the identity indicator corresponds to the user, the virtual item can be provided to the user. The method also can include receiving from a user a request to acquire the virtual item, receiving from an identity confirmation device an identity indicator exclusively unique to the identity confirmation device, and communicating the request and the identity indicator from the client device to a server (104).

14 Claims, 4 Drawing Sheets

(56) References Cited

OTHER PUBLICATIONS

SecurID card, http://www.techweb.com/encyclopedia/defineterm.jhtml?term=SecurIDcard, Accessed Nov. 30, 2007.
SecurID Token (Smartcard), http://www.pnl.gov/webmailhelp/secureid.htm, Accessed Oct. 11, 2007.

* cited by examiner

SECURE PAYMENT OF VIRTUAL ITEMS

BACKGROUND OF THE INVENTION

Field of the Invention

The present invention generally relates to payment transactions and, more particularly, to payment transactions for virtual items.

Background of the Invention

Over the last decade the popularity of massive multiplayer online games (MMOGs), for example World of Warcraft® and Second Life®, has grown significantly. With MMOGs, a very large number of game players who are communicatively linked via a network, such as the Internet, can game with one another in a commonly shared virtual gaming environment, also known as a "virtual world." In some MMOGs players can earn and collect virtual items within the games. For example, if a player earns enough points or completes a particular task, the player may be awarded a virtual weapon for use in the game, or a virtual object that provides the player with special powers or abilities within the game. Oftentimes such virtual items also may be purchased using real-world currency, either from virtual stores within the virtual worlds or from other players. Indeed, such trading has grown to an extent that it now represents a significant volume of global commerce.

The real-world currency is usually exchanged using a real-world financial account (e.g. a debit or credit account), while the virtual item is exchanged in a separate transaction between the seller and a virtual representation (e.g. avatar) of the player who is purchasing the virtual item. For such transactions, only one form of authentication, for instance the avatar, is required of the purchaser. Hence, the risk of fraud is high, especially if a player's password or account is known or compromised by another person.

SUMMARY OF THE INVENTION

The present invention relates to a method of conducting transactions for acquisition of virtual items. The method can include receiving from a user a request to acquire the first virtual item. Responsive to an identity indicator that is exclusively unique to an identity confirmation device being communicated from the identity confirmation device, a determination can be made whether the identity indicator corresponds to the user. Responsive to determining that the identity indicator corresponds to the user, the first virtual item can be provided to the user. The request and identity indicator can be received, for example, via a client device or a controller communicatively linked to the client device. In one arrangement, the first virtual item can be provided to an avatar within a virtual world. The avatar can be associated with the user.

Determining whether the identity indicator corresponds to the user can include determining whether the identity indicator matches a second identity indicator received from a financial service provider. Further, a financial service transaction can be requested in exchange for the first virtual item. In another arrangement, a second virtual item can be received in exchange for the first virtual item.

Another method of conducting transactions for acquisition of virtual items can include receiving from a user a request to acquire a virtual item, receiving from an identity confirmation device an identity indicator exclusively unique to the identity confirmation device, and communicating the request and the identity indicator from the client device to a server. In addition, a user name and a password also can be communicated to the server. The identity indicator can be received from a mobile communication device or a radio frequency identifier, and can be received via a wireless communication link or a communication bus. Receiving the request to acquire the virtual item can include receiving the request on a client device. Further, receiving the identity indicator also can include receiving the identity indicator on the client device or a controller communicatively linked to the client device.

The present invention also relates to a client device. The client device can include a user interface that receives from a user a request to acquire a first virtual item, a device interface that receives from an identity confirmation device an identity indicator exclusively unique to the identity confirmation device, and a network adapter that communicates the request and the identity indicator from the client device to a server. The device interface can receive the identity indicator from a mobile communication device or a radio frequency identifier.

The present invention further relates to an identity confirmation device. The identity confirmation device can include a data storage upon which an identity indicator exclusively unique to the identity confirmation device is stored, and a device interface via which the identity indicator is communicated to a client device in response to a purchase transaction for a virtual item being initiated.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The inventive arrangements described herein relate to a method and a system for conducting an acquisition of a virtual item. As used herein, the term "virtual item" means an incorporeal item (e.g. incapable of being perceived by the sense of touch). Examples of virtual items include, but are not limited to, electronic data, electronic files and electronic information. The acquisition may be conducted with the use of an identity confirmation device that confirms the identity of a user who desires to acquire the virtual item. The identity confirmation device can, for example, provide an identity indicator that is exclusively unique to the user and to the identity confirmation device.

Figure 1:
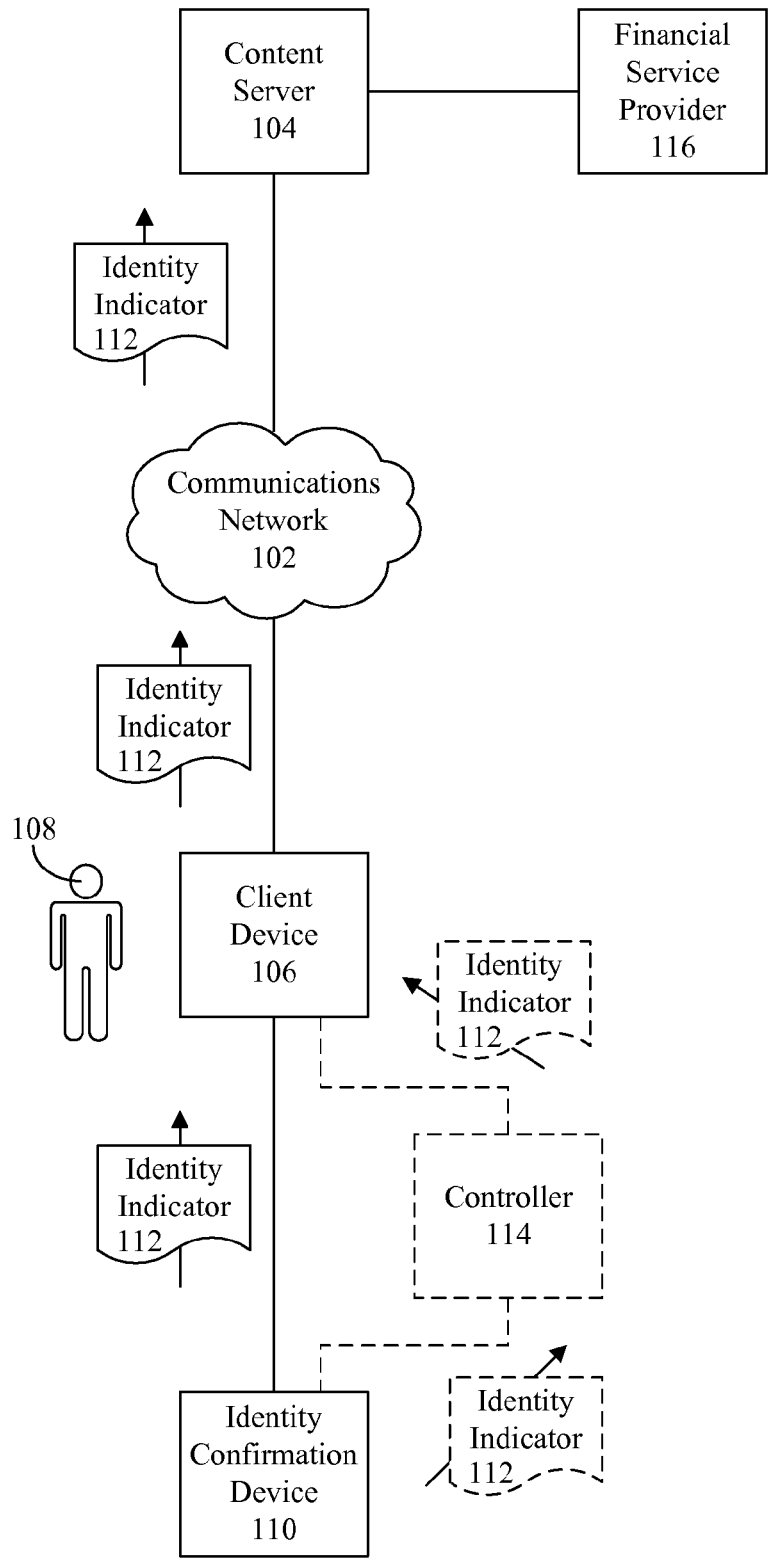
FIG. 1 depicts a system that is useful for understanding the present invention.

FIG. 1 depicts a system 100 that is useful for understanding the present invention. The system 100 can include a communications network 102, which may comprise a wide area network (WAN), such as the Internet, the World Wide Web, an interconnect communications network (e.g. a cellular communications network), a public switched telephone network (PSTN), and the like. The communications network also may comprise a local area network (LAN), a metropolitan area network (MAN), a WiFi network, a Mesh network, and/or any other networks or systems over which communication signals can be propagated. In that regard, the communications network 102 can include wired and/or wireless communication links.

The communications network 102 can be configured to communicate data via IEEE 802 wireless communications, for example, 802.11 and 802.16 (WiMAX), 3G, 4G, EUTRAN, UMB, WPA, WPA2, GSM, TDMA, CDMA, WCDMA, OFDM, direct wireless communication, or any other communications format. Indeed, the communications network 102 can be implemented in accordance with any suitable communications standards, protocols, and/or architectures, or a suitable combination of such standards, protocols, and/or architectures.

The system 100 also can include a content server 104 and a client device 106, each of which may comprise one or more processors/controllers, data storage devices, communication adapters, and/or other suitable components. The client device 106 can be a computer, a gaming console, a television, an audio/video system, a set-top box, a mobile station (e.g. a mobile telephone, mobile radio, mobile computer, personal digital assistant, or the like), an access terminal, or any other device that can receive media content.

The content server 104 can provide media content to the client device 106 via the communications network 102. For example, the content server 104 can host a massive multiplayer online game (MMOG) in which a user 108 of the client device 106 is participating. The content server 104 can, for instance, host a commonly shared virtual gaming environment, also known as a "virtual world," in which the user 108 is a participant. As such, the content server 104 can communicate gaming content to, and receive user inputs from, the client device 106. In another arrangement, the content server 104 can distribute textual, image, audio and/or video content to the client device 106. For instance, the content server 104 can host an on-line store through which textual, image, audio and/or video content may be acquired. In one arrangement, such content can be educational content.

The system 100 also can include an identity confirmation device 110. The identity confirmation device 110 can be any tangible object that is capable of communicating an identity indicator 112 to the content server 104. For example, the identity confirmation device 110 can be a mobile station (e.g. a mobile telephone, mobile radio, mobile computer, personal digital assistant, or the like), a radio frequency identifier (RFID), a near field communication device, an application specific identification device, or any other suitable device.

The identity indicator 112 can be an identifier that is exclusively unique to the user 108 and/or to the identity confirmation device 110. For example, the identity indicator 112 can be a media access control (MAC) address of the identity confirmation device 110, a serial number of the identity confirmation device 110, or an alphanumeric sequence assigned to the identity confirmation device 110 and/or assigned to the user 108. In another arrangement, the identity indicator 112 can be an indicator configured for limited use, for instance for use only in a limited number of acquisition transactions. In such an arrangement, the user 108 can remain anonymous. Still, any other unique identifier can be used as the identity indicator 112 and the invention is not limited in this regard.

The identity indicator 112 can be communicated from the identity confirmation device 110 to the client device 106 in any suitable manner. For example, the identity indicator 112 can be communicated directly from the identity confirmation device 110 to the client device 106. Alternatively, the identity indicator 112 can be communicated from the identity confirmation device 110 to a controller 114 that is communicatively linked to the client device 106, and the controller 114 can communicate the identity indicator 112 to the client device 106. The controller 114 can be, for instance, a game controller. Examples of game controllers can include, but are not limited to, gamepads, paddles, trackballs, joysticks, throttle quadrants, steering wheels, yokes, pedals, keyboards, mice, mousepads, light guns, touch screens, programmable personal computer controllers, and the like.

The identity confirmation device 110 can communicate with the client device 106 and/or the controller 114 via a wireless communication link, such as a communication link established in accordance with IEEE 802.11, Bluetooth®, ZigBee®, or any suitable near field communication protocol. The identity confirmation device 110 also can communicate with the client device 106 and/or the controller 114 via a wired communications interface, which can include, but is not limited to, a universal serial bus (USB) interface, an IEEE 1394 interface, a serial communications port, a parallel communications port, a network adapter, and the like. Other suitable devices (not shown) also can be used to facilitate communication of the identity indicator 112 from the identity confirmation device 110 to the client device 106. For example, the system 100 can include an RFID reader or an access point through which the identity indicator 112 may be communicated.

In operation, via the client device 106 the user 108 can initiate a transaction to acquire a virtual item. For example, the user 108 can initiate a transaction to purchase the virtual item with real world currency, with virtual currency, or in exchange for another virtual item. In one arrangement, the virtual item can be an item associated with a MMOG. For instance, the virtual item can be an item that provides the user 108 special powers, abilities, extended life or access to restricted gaming levels within the MMOG. In another arrangement, the virtual item can comprise textual, image, audio and/or video content.

The acquisition of the virtual item can be initiated in any suitable manner. For example, if the user 108 is playing in a MMOG, an avatar representing the player in a virtual world can approach a virtual store within the virtual world, or the avatar can interact with another avatar representing another player from whom the virtual item is to be acquired. In another example, if the virtual item is being acquired from an on-line store, via the client device 106 the user 108 can request that virtual items to be acquired be added to a virtual shopping cart. The user 108 then can request presentation of a checkout screen. Still, there are a myriad of other ways in which acquisition of a virtual item can be initiated and the invention is not limited in this regard.

The identity indicator 112 can be communicated from the identity confirmation device 110 to the client device 106 at the time of, prior to, or after initiation of the transaction to acquire the virtual item. The identity indicator 112 can be communicated from the client device 106 to the content server 104 via the communications network 102, or via another communications network (not shown). For example, if the client device 106 is communicatively linked to the content server 104 via a non-telephone based broadband communications network for the purpose of online gaming, the identity indicator 112 can be communicated to the content server 104 via a public switched telephone network. Such an arrangement can provide an added level of complexity to protect against unscrupulous individuals who may attempt to acquire the identity indicator 112 along with corresponding user account information.

Further, the client device 106 can receive the identity indicator 112 and temporarily store the identity indicator 112 until the identity indicator 112 is requested from the content server 104. In another arrangement, the client device 106 can communicate the identity indicator 112 to the content server 104 in response to receiving the identity indicator 112 from the identity confirmation device 110. Nonetheless, communication of the identity indicator 112 from the identity confirmation device 110 to the client device 106, and then to the content server 104 can be triggered in response to any other suitable event.

In one aspect of the inventive arrangements, a determination can be made whether to allow communication of the identity indicator 112 from the identity confirmation device 110 to the client device 106 based on any of a myriad of detectable conditions. For example, in an arrangement in which the client device 106 comprises a positioning system that determines a present location of the identity confirmation device, the client device 106 can be securely configured to only communicate the identity indicator 112 if the client device 106 is at a prescribed location, for instance within a home of the user 108. Alternatively, the location of the identity confirmation device can be communicated to the content server 104 along with the user's credentials (e.g. name and password) and, optionally, a geo-accurate time stamp. The content server 104 can verify whether the location matches the user's credentials. Thus, if the client device 106 is lost by the user 108, an unscrupulous user at another location can be prevented from using the identity indicator 112 for unauthorized transaction.

While processing the transaction to acquire the virtual item, the content server 104 can process the identity indicator 112 to confirm the identity of the user 108. For example, the content server 104 can verify whether the identity indicator 112 corresponds to a user account associated with the user or an in-game avatar initiating acquisition of the virtual item. Such avatar may be a specific avatar belonging to the user that is tasked with acquiring virtual items. The user account can be identified during the transaction to acquire the virtual item based upon a user name and a password. The user name and password can be communicated from the client device 106 to the content server 104 during log-in of the user 108 onto the content server 104 or at another suitable time.

In one arrangement, to determine whether there is a correspondence between the identity indicator 112 and the user 108, the content server 104 can determine whether the identity indicator 112 matches a second identity indicator received from a financial service provider 116 associated with the user 108 (e.g. associated with a financial or credit account assigned to the user 108). In another arrangement, the content server 104 can communicate the identity indicator 112 to a financial service provider 116, and the financial service provider 116 can determine whether the identity indicator 112 corresponds to a financial account, and then communicate to the content server 104 an indicator (not shown) of such determination. Notwithstanding, the identity indicator 112 can be processed in any other manner suitable for determining whether it corresponds to the user 108.

If it is determined that the identity indicator 112 does not correspond to the user 108, the request to acquire the virtual item can be denied. If, however, it is determined that the identity indicator 112 corresponds to the user 108, the content server 104 can request a financial service transaction in exchange for the first virtual item. For example, the content server 104 can request debit of an identified financial account by communicating with the financial service provider 116. If the financial service provider 116 indicates sufficient funds are available, the content server 104 can authorize completion of the transaction. The virtual item that is the subject of the transaction then can be provided to the user 108. For instance, the virtual item can be provided to the user's avatar within a virtual world, or communicated to the client device 106. If adequate funds are not available for the acquisition of the virtual item, a portion of funds can be received from a first financial account, and a remaining portion of the funds can be received from one or more additional financial accounts. Such financial accounts can be identified in user settings.

Figure 2:
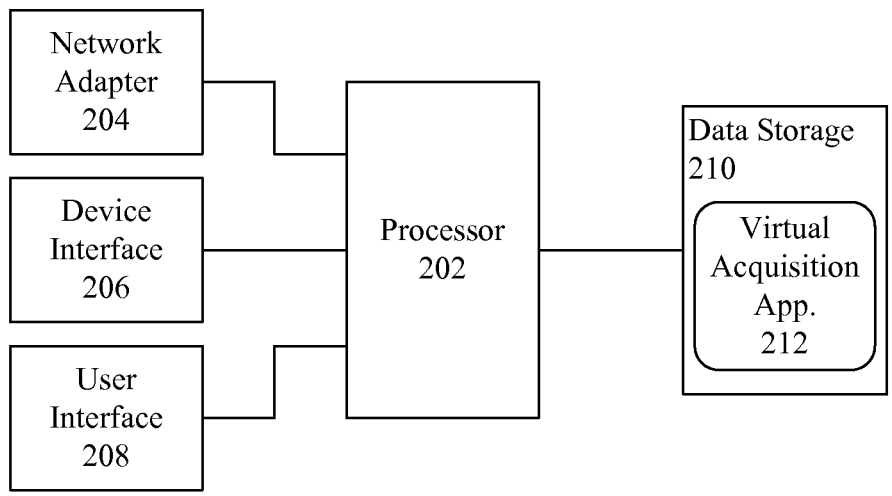
FIG. 2 depicts a block diagram of a client device that is useful for understanding the present invention.

FIG. 2 depicts a block diagram of a client device 106 that is useful for understanding the present invention. The client device 106 can include a processor 202, which can be any suitable processing system or group of processing systems. For example, the processor 202 can comprise one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The client device 106 can include a network adapter 204. The network adapter can be any communications adapter suitable for communicatively linking the client device 106 to the communications network. As such, the network adapter can be a wired network adapter or a wireless network adapter comprising a suitable transceiver. Network adapters are well known to the skilled artisan.

A device interface 206 also can be provided to communicatively link the client device 106 to the identity confirmation device and/or a controller to which the identity confirmation device is communicatively linked. As noted, the device interface can comprise a transceiver for communicating in accordance with IEEE 802.11, Bluetooth®, ZigBee®, or any suitable near field communication protocol. The device interface 206 also may include a USB interface, an IEEE 1394 interface, a serial communications port, a parallel communications port, a network adapter, or the like. In other arrangements the device interface 206 can include an RFID reader or an access point through which an identity indicator may be communicated. Still, the device interface 206 can include any other suitable communication interfaces and the invention is not limited in this regard.

A user interface 208 also can be provided to receive user inputs, for example requests to purchase virtual items, and present information to the user. The user interface 208 can include any suitable user interface devices, examples of which include, but are not limited to, keyboards, mice, joysticks, displays, touch screens, keys, soft keys, key pads, buttons, haptic devices (e.g. vibration modules), input audio transducers, output audio transducers, headsets, and the like.

The client device 106 also can include a data storage 210. The data storage 210 can include one or more storage devices, each of which may include, but is not limited to, a magnetic storage medium, an electronic storage medium, an optical storage medium, a magneto-optical storage medium, and/or any other storage medium suitable for storing digital information.

A virtual acquisition application 212 can be stored on the data storage 210. The virtual acquisition application 212 can be implemented within a browser or a gaming application, implemented as a plug-in for a network browser or a gaming application, or implemented as a stand-alone application. The virtual acquisition application 212 can be executed by the processor 202 to implement the methods and processes described herein which may be performed by a client device 106. For example, via the user interface 208 the virtual acquisition application 212 can receive a request to acquire a virtual item. Via the device interface 206, the virtual acquisition application 212 can receive an identity indicator that is exclusively unique to an identity confirmation device from which the identity indicator was received. Further, via the network adapter 204, the virtual acquisition application 212 can communicate the request and the identity indicator to a server.

Figure 3:
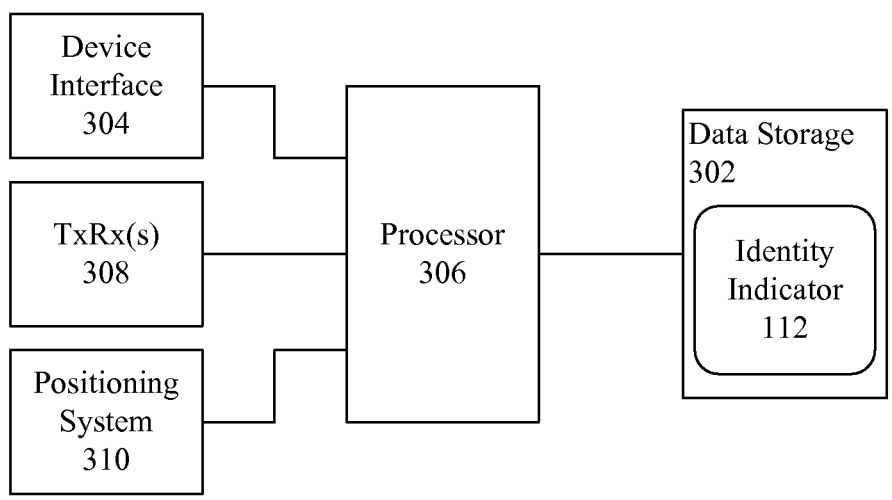
FIG. 3 depicts a block diagram of an identity confirmation device that is useful for understanding the present invention.

FIG. 3 depicts a block diagram of an identity confirmation device 110 that is useful for understanding the present invention. In its simplest form, the identity confirmation device 110 can include a data storage 302 on which the identity indicator 112 is stored. The data storage 302 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 302 can be included in the processor 306, but this need not be the case.

The identity confirmation device 110 optionally can include a device interface 304 for communicating with the device interface of the client device, or a controller communicatively linked to the client device. The device interface 304 can include a transceiver for communicating in accordance with IEEE 802.11, Bluetooth®, ZigBee®, or any suitable near field communication protocol. The device interface 304 also may include a USB interface, an IEEE 1394 interface, a serial communications adapter, a parallel communications adapter, a network adapter, or the like. In an arrangement in which the data storage 302 is a magnetic storage medium, for instance in the form of an RFID, the device interface 304 may not be required.

The identity confirmation device 110 optionally may include other components as well. For example, if the identity confirmation device 110 is embodied as a mobile station, the identity confirmation device 110 can include a processor 306, one or more transceivers 308, a positioning system 310, and/or other suitable components. As noted, the processor 306 can comprise one or more CPUs, one or more digital signal processors DSPs, one or more ASICs, one or more PLDs, a plurality of discrete components that can cooperate to process data, and/or any other suitable processing device. The processor can implement the methods and processes described herein that are performed by the identity confirmation device 110. For example, the processor can execute a suitable application to determine whether to communicate the identity indicator 112 to the client device based upon the present location of the identity confirmation device 110.

The transceiver 308 can send and receive wireless communications according to any of a variety of communication standards and/or protocols used by the identity confirmation device 110 to communicate. The positioning system 310 can be any system suitable for determining a present location of the identity confirmation device 110. For example, the positioning system 310 can comprise a global positioning system (GPS) and/or a local positioning system. Transceivers and positioning systems are well known to the skilled artisan.

Figure 4:
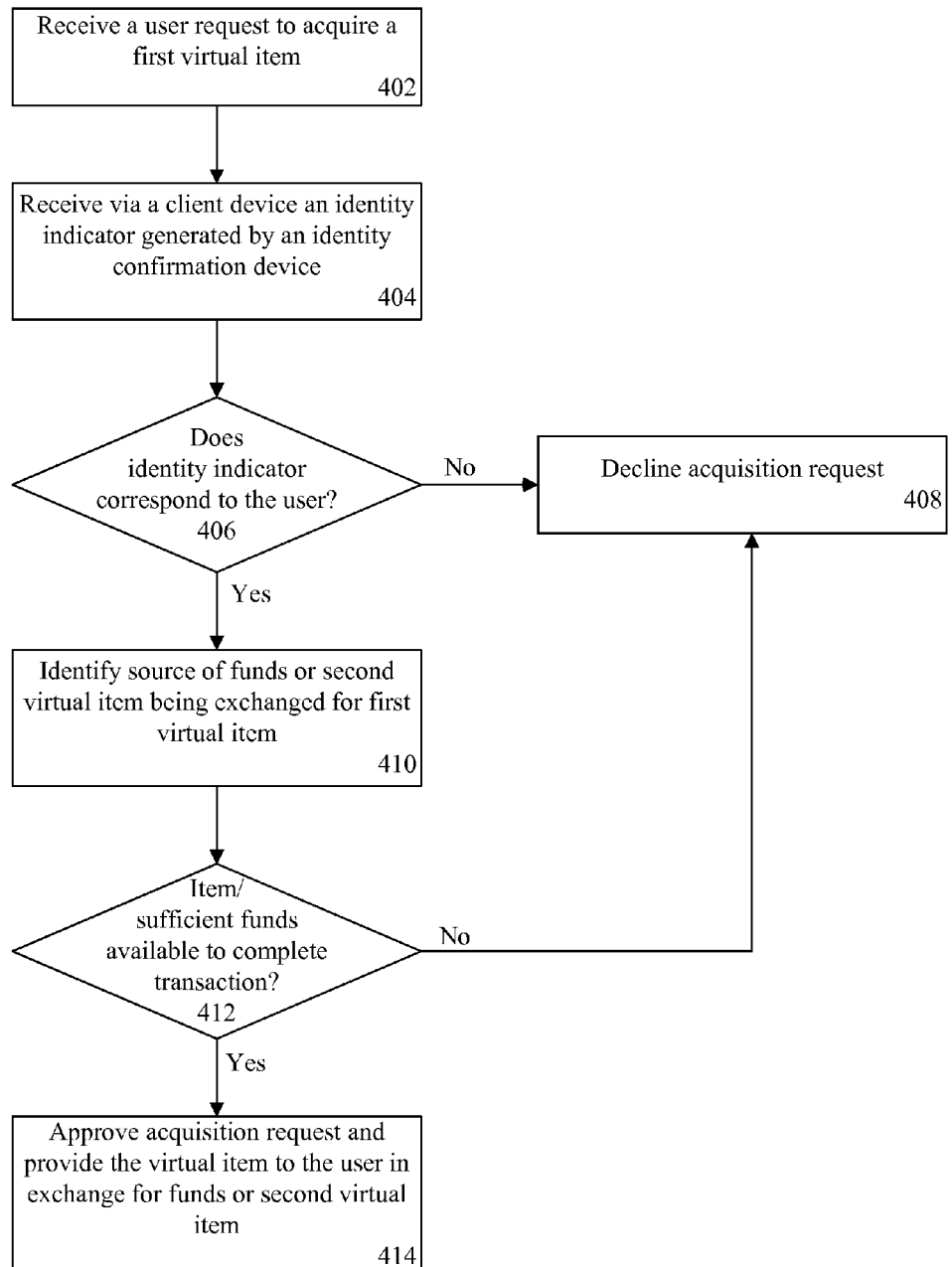
FIG. 4 is a flowchart depicting a method of conducting a financial transaction that is useful for understanding the present invention.

FIG. 4 is a flowchart depicting a method 400 of conducting transactions for acquisition of virtual items. The method 400 can be implemented by the content server, or another suitable server or device. At step 402, a user request to acquire a virtual item can be received from a user. At step 404, an identity indicator generated by an identity confirmation device can be received. For example, the identity indicator can be received from a client device which receives the identity indicator from an identity confirmation device.

Proceeding to decision box 406, a determination can be made whether the identity indicator corresponds to the user. If the identity indicator does not correspond to the user, at step 408 the request to acquire the virtual item can be declined. If the identity indicator does correspond to the user, at step 410 a source of funds or a second virtual item being exchanged for the virtual item being acquired can be identified. The funds can be real-world currency or virtual funds. For example, a financial account can be identified based on user preferences, information received from the user, or the identity information provided by the identity indicator.

Referring to decision box 412, a determination can be made whether sufficient funds or the second virtual item are available to complete the transaction. If sufficient funds or the second virtual item are not available, at step 408 the acquisition request can be declined. If, however, sufficient funds or the second virtual item are available, at step 414 the acquisition request can be approved and the virtual item can be provided to the user in exchange for the funds or the second virtual item. For example, the virtual item can be provided to an avatar in a virtual world, the avatar being associated with the user. In another arrangement, the acquired item can be provided to the client device, for instance as a download.

Figure 5:
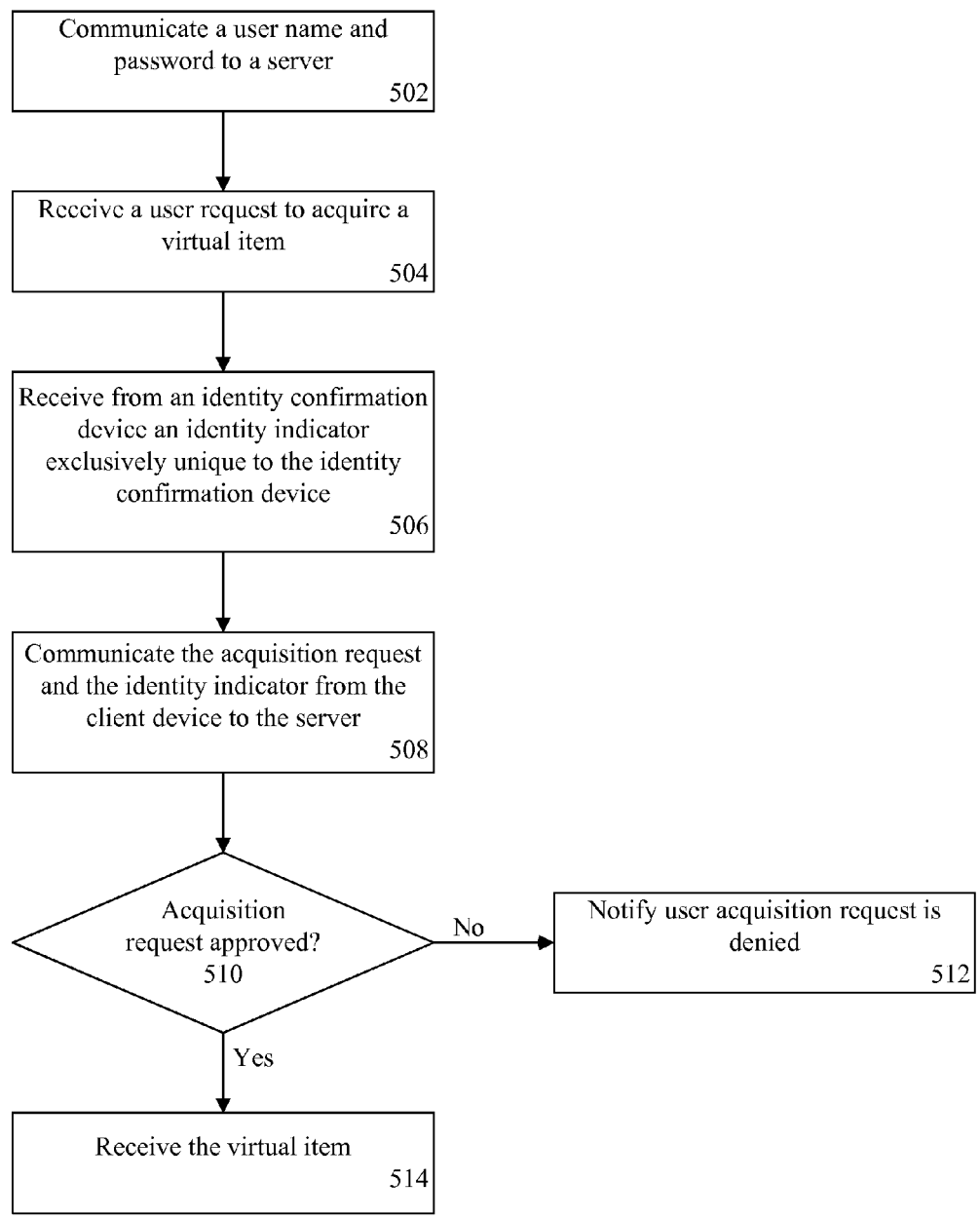
FIG. 5 is a flowchart depicting another method of conducting a financial transaction that is useful for understanding the present invention.

FIG. 5 is another flowchart depicting a method 500 of conducting a financial transaction. The method 500 can be implemented by the client device, or another suitable device. At step 502, a user name and password can be communicated to a server. For example, the user name and password can be communicated while logging into a MMOG or while logging into a virtual store. At step 504, a user request to acquire a virtual item can be received from a user. At step 506, an identity indicator exclusively unique to an identity confirmation device can be received from the identity confirmation device. Proceeding to step 508, the acquisition request and the identity indicator can be communicated from the client device to the server.

Referring to decision box 510, a determination can be made by the server whether the acquisition request is approved. If the acquisition request is denied, the client device can receive an indicator of the denial from the server and, at step 512, the user can be notified that the acquisition request is denied. Otherwise, at step 514 the client device can receive the virtual item.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of conducting transactions for acquisition of virtual items, comprising:
   via a processor, receiving from a user a request to acquire a first virtual item;
   responsive to an identity indicator that is exclusively unique to an identity confirmation device being communicated from the identity confirmation device to a client device, and from the client device to a server, determining, via the processor, whether the identity indicator corresponds to the user; and
   responsive to determining that the identity indicator corresponds to the user, via the processor, providing the first virtual item to an avatar within a virtual world, the avatar being associated with the user.

2. The method of claim 1, wherein receiving from the user the request to acquire the first virtual item comprises receiving the request via the client device.

3. The method of claim 2, further comprising, via the processor, receiving the identity indicator via a controller communicatively linked to the client device.

4. The method of claim 1, wherein determining whether the identity indicator corresponds to the user comprises determining whether the identity confirmation device is at a prescribed location.

5. The method of claim 1, wherein:
   determining whether the identity indicator corresponds to the user comprises determining whether the identity indicator matches a second identity indicator received from a financial service provider;
   further comprising, via the processor, requesting a financial service transaction in exchange for the first virtual item.

6. The method of claim 1, further comprising, via the processor, receiving a second virtual item in exchange for the first virtual item.

7. A method of conducting transactions for acquisition of virtual items, comprising:
   via a processor of a client device, receiving from a user a request to acquire a virtual item;
   via the processor, receiving from an identity confirmation device an identity indicator exclusively unique to the identity confirmation device;
   via the processor, communicating the request and the identity indicator from the client device to a server; and
   providing the virtual item to an avatar within a virtual world, the avatar being associated with the user.

8. The method of claim 7, further comprising communicating a user name and a password to the server.

9. The method of claim 7, wherein receiving the identity indicator comprises receiving the identity indicator from a mobile communication device.

10. The method of claim 7, wherein receiving the identity indicator comprises receiving the identity indicator from a radio frequency identifier.

11. The method of claim 7, wherein receiving the identity indicator comprises receiving the identity indicator via a wireless communication link.

12. The method of claim 7, wherein receiving the identity indicator comprises receiving the identity indicator via a communication bus.

13. The method of claim 7, wherein receiving the request to acquire the virtual item comprises receiving the request on the client device.

14. The method of claim 13, wherein receiving the identity indicator comprises receiving the identity indicator a controller communicatively linked to the client device.

\* \* \* \* \*